(12) United States Patent
Shimizu

(10) Patent No.: US 10,707,542 B2
(45) Date of Patent: Jul. 7, 2020

(54) NON-AQUEOUS ELECTROLYTE SECONDARY BATTERY CELL AND ASSEMBLED BATTERY USING SAME

(71) Applicant: E-GLE CO., LTD., Kawasaki-shi, Kanagawa (JP)

(72) Inventor: Hiroshi Shimizu, Kawasaki (JP)

(73) Assignee: E-GLE CO., LTD., Kanagawa (JP)

( * ) Notice: Subject to any disclaimer, the term of this patent is extended or adjusted under 35 U.S.C. 154(b) by 123 days.

(21) Appl. No.: 15/774,107

(22) PCT Filed: Nov. 11, 2016

(86) PCT No.: PCT/JP2016/083556
§ 371 (c)(1),
(2) Date: May 7, 2018

(87) PCT Pub. No.: WO2017/082399
PCT Pub. Date: May 18, 2017

(65) Prior Publication Data
US 2018/0331399 A1 Nov. 15, 2018

(30) Foreign Application Priority Data
Nov. 12, 2015 (JP) ................................ 2015-222522

(51) Int. Cl.
*H01M 2/00* (2006.01)
*H01M 10/48* (2006.01)
(Continued)

(52) U.S. Cl.
CPC .......... *H01M 10/486* (2013.01); *H01M 2/14* (2013.01); *H01M 2/30* (2013.01); *H01M 2/348* (2013.01);
(Continued)

(58) Field of Classification Search
CPC ............. H01M 2/30; H01M 2200/106; H01M 10/0587; H01M 10/48; H01M 10/654; H02J 7/00
See application file for complete search history.

(56) References Cited

U.S. PATENT DOCUMENTS 6,475,662 B1 * 11/2002 Spencer .................. H01M 6/30
429/102
2006/0275665 A1 12/2006 Hyung et al.
(Continued)

FOREIGN PATENT DOCUMENTS

| JP | H07272748 A | 10/1995 |
|---|---|---|
| JP | H10214613 A | 8/1998 |

(Continued)

OTHER PUBLICATIONS

International Search Report dated Jan. 31, 2017 for PCT/JP2016/083556 to E-GLE CO., LTD. filed Nov. 11 2016

*Primary Examiner* — Chanceity N Robinson
*Assistant Examiner* — Monique M Wills
(74) *Attorney, Agent, or Firm* — Vorys, Sater, Seymour and Pease LLP

(57) ABSTRACT

Non-aqueous electrolyte secondary battery cell having safety and increased energy density, and battery using same. The cell is shaped as a rounded square tube. A core material for preventing electrolyte permeation is at the cell center, the core member being a hollow cylindrical insulator of square cross-section. A cell monitoring system such as a temperature sensor is provided in the hollow part of the core material. A cell base member including positive electrode member, separator, and negative electrode member of a non-aqueous electrolyte secondary battery is wound around the core material. Terminals made of electroconductive metal electrically connected to the collector of the positive electrode member or the collector of the negative electrode (Continued)

member are exposed to the cell exterior. The temperature sensor is attached to the center part of the hollow part of the core material in close contact with the core material.

18 Claims, 8 Drawing Sheets

(51) Int. Cl.
| | |
|---|---|
| *H01M 2/30* | (2006.01) |
| *H01M 10/0587* | (2010.01) |
| *H01M 10/643* | (2014.01) |
| *H01M 10/613* | (2014.01) |
| *H01M 10/0585* | (2010.01) |
| *H01M 10/654* | (2014.01) |
| *H02J 7/00* | (2006.01) |
| *H01M 10/052* | (2010.01) |
| *H01M 10/42* | (2006.01) |
| *H01M 10/04* | (2006.01) |
| *H01M 2/34* | (2006.01) |
| *H01M 2/14* | (2006.01) |
| *H01M 4/64* | (2006.01) |
| *H01M 10/0525* | (2010.01) |
| *H01M 10/44* | (2006.01) |
| *H01M 4/505* | (2010.01) |
| *H01M 4/583* | (2010.01) |
| *H01M 4/02* | (2006.01) |

(52) U.S. Cl.
CPC .......... *H01M 4/64* (2013.01); *H01M 10/0431* (2013.01); *H01M 10/052* (2013.01); *H01M 10/0525* (2013.01); *H01M 10/0585* (2013.01); *H01M 10/0587* (2013.01); *H01M 10/425* (2013.01); *H01M 10/4257* (2013.01); *H01M 10/48* (2013.01); *H01M 10/613* (2015.04); *H01M 10/643* (2015.04); *H01M 10/654* (2015.04); *H02J 7/00* (2013.01); *H01M 4/505* (2013.01); *H01M 4/583* (2013.01); *H01M 10/44* (2013.01); *H01M 2004/027* (2013.01); *H01M 2004/028* (2013.01); *H01M 2010/4271* (2013.01); *H01M 2010/4278* (2013.01); *H01M 2200/106* (2013.01)

(56) References Cited

U.S. PATENT DOCUMENTS

| | | | |
|---|---|---|---|
| 2012/0082882 | A1 | 4/2012 | Wei |
| 2012/0279053 | A1* | 11/2012 | Kusama ............... H01M 2/266 29/623.1 |

FOREIGN PATENT DOCUMENTS

| | | |
|---|---|---|
| JP | 2001313078 A | 11/2001 |
| JP | 2006286624 A | 10/2006 |
| JP | 2012174344 A | 9/2012 |
| JP | 2012212506 A | 11/2012 |
| JP | 2012529729 A | 11/2012 |

* cited by examiner

NON-AQUEOUS ELECTROLYTE SECONDARY BATTERY CELL AND ASSEMBLED BATTERY USING SAME

CROSS-REFERENCE TO RELATED APPLICATIONS

This is a § 371 National Stage Application of International Application No. PCT/JP2016/083556 filed on Nov. 11, 2016, claiming the priority of Japanese Patent Application No. 2015-222522 filed on Nov. 12, 2015.

TECHNICAL FIELD

This invention relates to a non-aqueous electrolyte secondary battery cell of a lithium-ion battery, etc., which is used in electric cars, energy storage, and so forth, and to a battery pack that employs the non-aqueous electrolyte secondary battery cell, and the invention is characterized by being able to significantly increase density of energy for practical use while ensuring safety and utilizing already-available battery materials.

BACKGROUND ART

A lithium-ion battery used in electric cars or the like is constituted by a positive electrode active material provided around a positive electrode current collector and a negative electrode active material provided around a negative electrode current collector with a separator being interposed between both active materials. Aluminum is often used for the positive electrode current collector and copper is often used for the negative electrode current collector. Lithium-containing manganese oxide or the like is used for the positive electrode active material and graphite or the like is used for the negative electrode active material. The separator is an organic substance in the form of a thin film with micropores, and an electrolyte is separated into a solute and a solvent.

In such a conventional lithium-ion battery, a battery cell and a cell monitoring system for detecting temperatures, voltages, and so on of the cell are provided as separate components and no function for heat dissipation is provided inside the battery cell; therefore, a cell monitoring system and a heat dissipation function are provided outside the battery cell to form a module and a plurality of such modules are provided to form a battery pack. When modules and a battery pack are formed in such a way, the energy density is reduced to half or less in comparison with the energy density of a single battery cell.

One of the reasons for which it is impossible to attain high energy density, as described above, is related to safety issues. Among reasons for decrease in safety, the first reason is electrolyte liquid leakage of the separator. When there is liquid leakage, lithium hexafluorophosphate as a solute dissolves in water to emit hydrofluoric acid, which is hazardous because of being toxic to the human organism and also flammable. The second reason is the possibility of overcharge. In the state of overcharge, a positive electrode material emits oxygen (O), which may result in catching fire. The third reason is the possibility of short circuiting. Occurrence of short circuiting may lead to sudden temperature increase inside the cell, which may result in catching fire. Short circuiting includes internal short circuiting and external short circuiting. Internal short circuiting is short circuiting that is caused by metallic contaminants mixing in during manufacture, but today, factories are under good control, so internal short circuiting does not occur. Meanwhile, external short circuiting may still occur.

Regarding these safety issues, no sufficient measures have been taken so far against liquid leakage, overcharge, or high temperatures in battery cells. Further, as a result of placing importance on safety, attempts are made to obtain margin for safety in the process of cell manufacture, module manufacture, battery pack manufacture, or installment in electric cars, which essentially have little relevance to safety itself but result in the battery system becoming heavier than necessary and also lead to a decrease in capacity for practical use.

Patent Document 1 provides measures against liquid leakage and overcharge among the issues described above. In the invention of Patent Document 1, for the purpose of reducing a volume of an overall size of a cell monitoring system and a cell used for a non-aqueous electrolyte secondary battery, a battery device is developed in which an electric circuit substrate on which the cell monitoring system is arranged and a non-aqueous electrolyte battery are mounted in a single housing and electro-conductive portions of the electric circuit substrate and the electric circuit element are covered with an insulator that is resistant to a non-aqueous electrolyte solution.

Patent Document 2 relates to a non-aqueous electrolyte secondary battery, in which, for the purpose of ensuring safety by reliably detecting an increase in battery temperature without compromising on power capacity and properties even for medium- or large-capacity batteries, a heat-sensitive element is disposed in a columnar space formed in the central part of a cylindrical electrode group that is wound in the shape of a spiral, i.e., the heat-sensitive element is disposed in an inner-diameter space of the electrode group.

Patent Document 3 aims to provide a laminate-type battery that is provided with a laminate electrode body with a large number of layers and a wound electrode body with a large number of winds, is highly reliable, and has a high degree of freedom in the position at which an external terminal is drawn out. Here, provided is a battery in which an electrode body including a sheet-like positive electrode, sheet-like negative electrode, and separator is accommodated in a laminate film exterior body, where the battery includes a laminate electrode body in which the number of electrode layers is 20 or more or a wound electrode body in which the number of winds is ten or more; a positive electrode tab laminate, in which a plurality of positive electrode tabs relating to the sheet-like positive electrode are laminated, is divided into a plurality of positive electrode tab laminates that are each connected to different positive electrode external terminals, and the positive electrode external terminals are electrically connected to each other either inside or outside the laminate film exterior body; and a negative electrode tab laminate, in which a plurality of negative electrode tabs relating to the sheet-like negative electrode are laminated, is divided into a plurality of negative electrode tab laminates that are each connected to different negative electrode external terminals, and the negative electrode external terminals are electrically connected to each other either inside or outside the laminate film exterior body.

PRIOR ART DOCUMENT

Patent Documents

Patent Document 1: Japanese Patent Application Publication No. H07-272748

Patent Document 2: Japanese Patent Application Publication No. H 10-214613

Patent Document 3: Japanese Patent Application Publication No. 2012-212506

DISCLOSURE OF INVENTION

Problem to be Solved by the Invention

The invention of Patent Document 1 lacks a mechanism which actively dissipates heat from a substrate for various electric circuits (cell monitoring system). Thus, heat from the substrate for various electric circuits may induce a temperature increase inside the battery housing, which may bring about an even more dangerous state. Moreover, three signal terminals from the substrate for various electric circuits are provided so as to be exposed to the outside, and these portions may become the cause of liquid leakage.

In the invention of Patent Document 2, a heat-sensitive element is placed inside the battery cell but the heat-sensitive element is merely used to measure temperatures, and the breaking of charged power at the time of overcharge is reliant on a safety device attached to the battery pack. A failure of the safety device to operate normally increases the possibility of inducing overcharge, so it is necessary to design the inside of the battery cell in such a manner as to ensure safety of the safety device. Besides, while additional terminals are provided on the cell case to sense heat, these terminals increase the risk of electrolyte liquid leakage.

In the invention of Patent Document 3, the current collectors are partially integrated; because of this, however, a heat dissipation effect based on the use of electric resistance and current collectors is attained only partially. Further, a cell, which has a laminate structure that covers the entire cell, has a shortcoming in terms of the external housing becoming heavy. Moreover, there is no means provided inside the battery cell to cope with the risk of liquid leakage, overcharge, and external short circuiting.

In view of the above, this invention provides a non-aqueous electrolyte secondary battery cell in which a cell monitoring system is provided inside the battery cell, heat dissipation for positive electrode and negative electrode members is carried out via current collectors and terminals, and other relevant measures are taken to ensure safety, thus enabling increase in energy density, and the invention also provides a battery pack that employs this battery cell.

Means for Solving the Problem

The invention as set forth in claim 1 is a non-aqueous electrolyte secondary battery cell, in which, in a non-aqueous electrolyte secondary battery, the cell itself has a shape of a cylinder or a polygonal tube with rounded corners; a hard core material is provided at a center of the cell, the core material being an insulating body having a circular or quadrangular cross-section and having a shape of a hollow tube, the core material preventing permeation of an electrolyte; a cell monitoring system is provided inside a hollow part of the core material, the cell monitoring system comprising a voltage sensor, temperature sensor, and balancer for the cell, the voltage sensor, the temperature sensor, and the balancer being attached to the cell monitoring system; a cell basic member constituted by a positive electrode member, separator, and negative electrode member for the non-aqueous electrolyte secondary battery is wound or laminated on the core material serving as a shaft; an electro-conductive terminal electrically connected to a current collector of the positive electrode member and an electro-conductive terminal electrically connected to a current collector of the negative electrode member are provided on the cell, the terminals being exposed to outer sides of the cell; and the temperature sensor of the cell monitoring system is attached to a central part of the hollow part of the core material by being firmly adhered to the core material, and the non-aqueous electrolyte secondary battery cell is connected with a wire used to dissipate heat generated at the balancer via the terminal of the positive electrode or the terminal of the negative electrode.

The invention as set forth in claim 2 is the non-aqueous electrolyte secondary battery cell set forth in claim 1, in which a Zener diode consuming surplus electric power at the time of overcharge is provided inside the cell monitoring system, and the non-aqueous electrolyte secondary battery cell is connected with a wire used to dissipate heat generated at the Zener diode via the terminal of the positive electrode or the terminal of the negative electrode.

The invention as set forth in claim 3 is the non-aqueous electrolyte secondary battery cell set forth in claim 1 or 2, in which the terminals are provided on both sides of the core material concentrically with the core material, the terminals being used for the positive electrode and the negative electrode, respectively; and the current collectors of the positive electrode member and the negative electrode member are extended toward the terminals on mutually opposite sides, the current collectors being connected to the terminals of the positive electrode and the negative electrode, respectively, in a direct, electrical, and heat-conductive manner.

The invention as set forth in claim 4 is the non-aqueous electrolyte secondary battery cell set forth in claim 3, in which a flange is provided integrally with each of the terminals of the positive electrode and the negative electrode, the flanges being centered on the corresponding terminals, the flanges and the terminals being made of the same material, the flanges respectively covering both ends of the wound or laminated cell basic member constituted by the positive electrode member, the separator, and the negative electrode member; a fold-back edge is provided on an outer circumferential edge of each of the flanges, the fold-back edges being oriented toward the center of the cell; and the non-aqueous electrolyte secondary battery cell comprises a laminate film installed on the non-aqueous electrolyte secondary battery cell, both ends of the laminate film being bonded to the fold-back edges of the flanges on both sides, respectively, the laminate film covering the cell, the laminate film preventing leakage of an electrolyte inside the cell to outside the cell.

The invention as set forth in claim 5 is the non-aqueous electrolyte secondary battery cell set forth in any one of claims 1 to 4, in which an electro-conductive first fitting member, such as a male screw, is provided on an outer tip part of the terminal of the positive electrode, the first fitting member being integral with the terminal of the positive electrode; an electro-conductive second fitting member, such as a female screw, is provided on an outer tip part of the terminal for the negative electrode, the first fitting member being configured to be fitted into the second fitting member.

The invention as set forth in claim 6 incorporates the invention as set forth in claim 5, and is the non-aqueous electrolyte secondary battery cell in which fitting portions of the first fitting member and the second fitting member are plated with plate preventing electrolytic corrosion.

The invention as set forth in claim 7 is the non-aqueous electrolyte secondary battery cell set forth in any one of claims 1 to 5, in which an element is installed between the terminal and the current collector of the positive electrode or between the terminal and the current collector of the negative electrode, the element being a PTC element or the like, a resistance value of the element sharply increasing due to heat; and the element provides the non-aqueous electrolyte secondary battery cell with a function of, at the time of a temperature increase inside the battery cell, breaking an electric current flowing through the battery cell and another battery cell.

The invention as set forth in claim 8 incorporates the invention as set forth in claim 7, and is the non-aqueous electrolyte secondary battery cell in which contact portions of the terminal, the element with the sharply increasing resistance value, and the current collector are plated with plate preventing electrolytic corrosion, the terminal, the element, and the current collector contacting one another at the contact portions.

The invention as set forth in claim 9 is the non-aqueous electrolyte secondary battery cell set forth in any one of claims 1 to 8, in which an electrolyte of the cell basic member is gel-like, and the gel-like electrolyte is coated onto respective outer circumferential surfaces of a positive electrode active material and a negative electrode active material of the cell basic member.

The invention as set forth in claim 10 is the non-aqueous electrolyte secondary battery cell set forth in any one of claims 1 to 9, in which a unit configured to transmit measurement information signals of the temperature sensor and the voltage sensor from the cell monitoring system to outside the battery cell, or to transmit signals from outside the cell to the cell monitoring system, employs either wired communication via the terminal of the positive electrode or the negative electrode or wireless communication using radio waves.

The invention as set forth in claim 11 is the non-aqueous electrolyte secondary battery cell set forth in claim 10, in which the unit configured to transmit measurement information signals of the temperature sensor and voltage sensor from the cell monitoring system to outside the battery cell, or to transmit signals from outside the battery cell to the cell monitoring system, is provided with a signal transmitting-receiving function using a spread-spectrum technique, the signal transmitting-receiving function being attained by perforating a thin hole at a center of the terminal of the positive electrode or the negative electrode coaxially with this terminal, and by inserting into the hole a non-metallic material with high radio wave transmissivity; and via this material, the measurement information signals of the temperature sensor and the voltage sensor from the cell monitoring system are transmitted to outside the battery or the signals from outside the battery are transmitted to the cell monitoring system.

The invention as set forth in claim 12 is the non-aqueous electrolyte secondary battery cell set forth in claim 10 or 11, provided with a signal transmitting-receiving function using either wired or wireless communication and employing time division multiplexing or multiplexing based on a spread-spectrum technique for communication signals from one or more non-aqueous electrolyte secondary battery cells.

The invention as set forth in claim 13 is a battery pack of non-aqueous electrolyte secondary batteries, the battery pack comprising the non-aqueous electrolyte secondary battery cell set forth in any one of claims 5 to 12 in a plurality, the non-aqueous electrolyte secondary battery cells being connected to one another using the first fitting member and the second fitting member, where the battery pack comprises an overcharge prevention device; the overcharge prevention device comprises an overcharge prevention switch attached to a positive electrode of the battery pack and an overcharge prevention switch attached to a negative electrode of the battery pack; the overcharge prevention switches are configured to automatically stop charging on the basis of a voltage value measured in the cell monitoring system; and the switches are actuated at a voltage that is 0.02±0.01 V lower than a voltage value at which the Zener diode starts discharge of an overcharge current.

The invention as set forth in claim 14 is a battery pack of non-aqueous electrolyte secondary batteries, the battery pack comprising the non-aqueous electrolyte secondary battery cell set forth in any one of claims 5 to 12 in a plurality, the non-aqueous electrolyte secondary battery cells being connected to one another using the first fitting member and the second fitting member, where the battery pack comprises an external short circuiting prevention switch comprising a current measurement instrument; the current measurement instrument is attached to either a positive electrode or a negative electrode of the battery pack; and when an electric current exceeding a predetermined electric current value flows, the external short circuiting prevention switch automatically stops the electric current.

Effects of the Invention

In the invention as set forth in claim 1, the temperature sensor and voltage sensor of the cell monitoring system are accommodated in the hollow part of the core material in the battery cell, so it is possible to measure the temperature and voltage of the battery accurately. The temperature sensor, in particular, can reliably sense a temperature increase in the cell basic member so as to enable suppression of same, because the temperature sensor is attached to the core material at the central part of the hollow part of the core material by being firmly adhered thereto. Moreover, since there is employed a configuration in which heat generated at the balancer accommodated in the hollow part of the core material is dissipated via the positive electrode or negative electrode terminal, a temperature increase in the battery is suppressed even more reliably.

The invention as set forth in claim 2 employs a configuration in which a Zener diode that consumes surplus electric power at the time of overcharge is provided in the cell monitoring system, and heat generated at the Zener diode is dissipated via the positive electrode or negative electrode terminal, and therefore, a temperature increase in the battery due to overcharge can be reliably suppressed.

In the invention as set forth in claim 3, the cell basic member constituted by the positive electrode member, separator, and negative electrode member for the non-aqueous electrolyte secondary battery is wound or laminated on the core material serving as a shaft, and the current collectors of the positive electrode member and the negative electrode member are extended in opposite directions and are connected to the terminals provided on both ends of the core material in a direct, electrical, and heat-conductive manner, whereby a highly efficient, compact structure is achieved.

In the invention as set forth in claim 4, there is employed a configuration in which flanges centered on the positive electrode and negative electrode terminals are provided and the laminate film, both ends of which are bonded to the fold-back edges on the outer circumferences of the flanges, cover the wound or laminated cell basic member constituted by the positive electrode member, separator, and negative electrode member; therefore, the electrolyte inside the cell is prevented from leaking to the outside.

In the invention as set forth in claims 5 and 6, when a plurality of battery cells are connected to one another, the first fitting member (e.g., a male screw), which is provided on either terminal of one battery cell, can be inserted in and screwed together with the second fitting member (e.g., a female screw) of another battery cell to be connected thereto, thereby directly connecting the batteries; thus, a compact battery pack can be formed. Furthermore, in the invention as set forth in claim 6 in particular, even when the first and second fitting members are made from metal that may cause electrolytic corrosion due to the members being fitted together, plating of the members prevents electrolytic corrosion.

In the invention as set forth in claims 7 and 8, an element such as a PTC element, a resistance value of which sharply increases due to heat, is provided between the positive electrode or negative electrode terminal and the current collector so that the resistance value increases when there is a temperature increase, breaking the electric current. Accordingly, the battery is prevented from reaching a high temperature when there is external short circuiting. Furthermore, in the invention as set forth in claim 8 in particular, even when the terminal, the element in which the resistance value increases sharply due to heat, and the current collector are made from metal that may cause electrolytic corrosion due to contact thereamong, plating of those components prevents electrolytic corrosion.

In the invention as set forth in claim 9, the electrolyte of the separator is gel-like, and the gel-like electrolyte is coated onto respective outer circumferential surfaces of the positive electrode active material of the positive electrode member and negative electrode active material of the negative electrode member; therefore, the electrolyte liquid is prevented from leaking from the terminal of the separator. This effect and the cell structure of the invention as set forth in claim 4 together provide a double safety measure in terms of prevention of liquid leakage.

In the invention as set forth in claims 10, 11, and 12, the unit used to transmit measurement information signals of the temperature sensor and voltage sensor from the cell monitoring system to outside the battery cell, or to transmit signals from outside the cell to the cell monitoring system, employs either wired transmission via the terminal of the positive electrode or negative electrode or wireless communication, and performs communication using time division multiplexing or multiplexing based on a spread-spectrum technique, etc. for communication signals from a plurality of batteries. Therefore, signals from a plurality of cells are multiplexed while interference therebetween is avoided and noise immunity is also obtained. Moreover, no terminals other than the terminals for the positive and negative electrodes need to be projected to outside the battery cell, and the possibility of liquid leakage is reduced accordingly.

In the invention as set forth in claim 13, the battery pack in which a plurality of batteries are connected to one another has installed thereon an overcharge prevention device that includes overcharge prevention switches attached to the positive and negative electrodes of the battery pack, which automatically stop charging on the basis of the voltage value measured in the cell monitoring system, and the switches are actuated at a voltage that is 0.02±0.01 V lower than the voltage value at which the Zener diode starts discharge of an overcharge current. Therefore, overcharge can be prevented reliably. This effect together with the effect exhibited by the Zener diode for preventing overcharge, which is provided inside the hollow core material of the cell, provide a double measure to prevent overcharge.

In the invention as set forth in claim 14, the battery pack in which a plurality of non-aqueous electrolyte secondary batteries are connected to one another has installed thereon an external short circuiting prevention switch that detects an overcurrent of a threshold or more to stop the electric current. Thus, the risk of catching fire due to a sudden temperature increase in the cell caused by external short circuiting is prevented.

DESCRIPTION OF THE EMBODIMENTS

Figure 1:
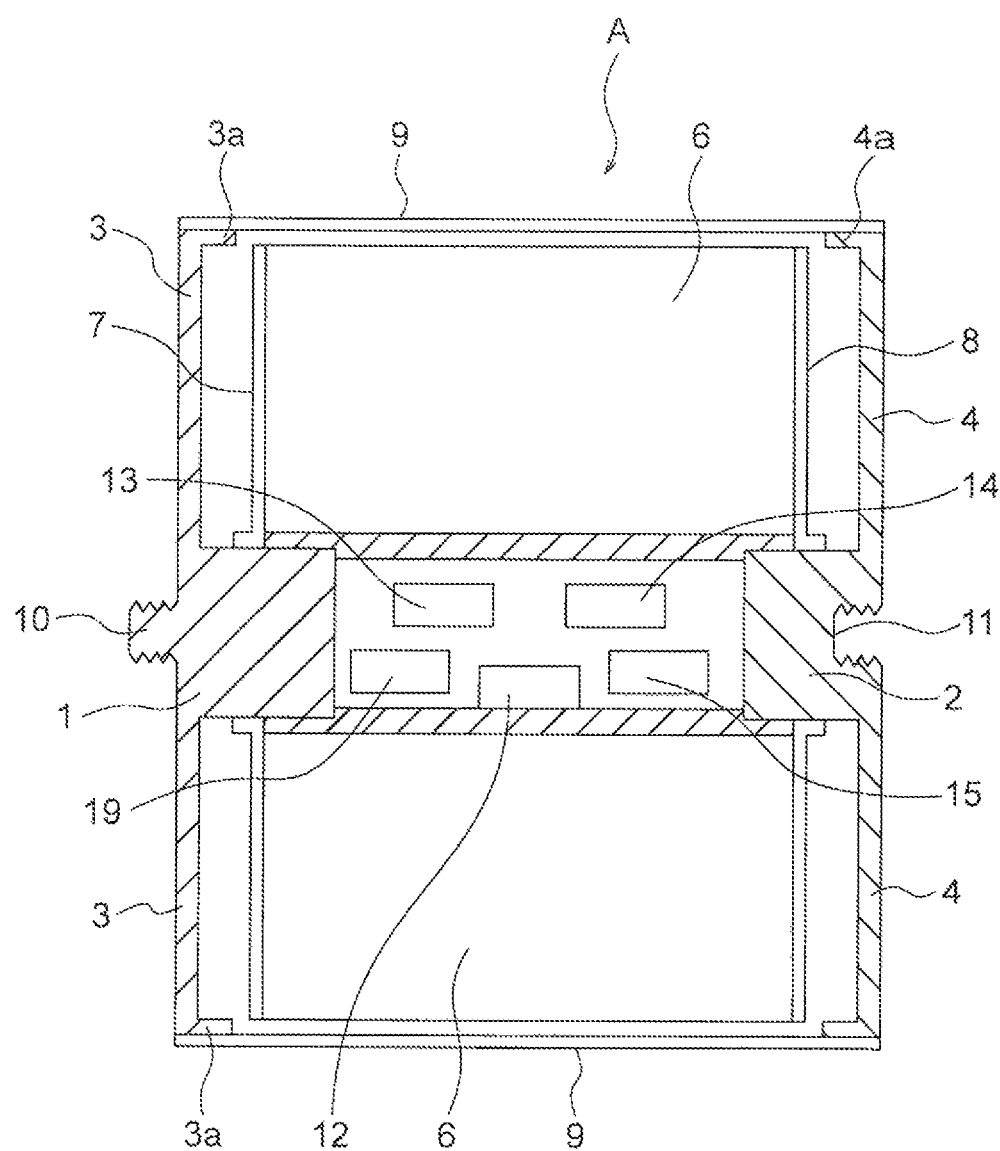
FIG. 1 is a schematic cross-sectional diagram of a non-aqueous electrolyte secondary battery cell according to exemplary embodiment 1 of this invention.

A non-aqueous electrolyte secondary battery cell A according to exemplary embodiment 1 of this invention will be explained on the basis of FIGS. 1 to 8.

In the non-aqueous electrolyte secondary battery cell A, two metal plates, each of which has the shape of a quadrangle with rounded corners and is highly electro-conductive, are provided so as to face each other while being spaced apart from each other; central parts of the two metal plates project in swelling fashion and inwardly; a cross section of each of these projections is approximately quadrangular; either one of the projections and the central part of the metal plate, which is contiguous to the projection, serve as either a positive electrode or negative electrode terminal 1 or 2; and portions of the metal plates around the terminals 1 and 2 serve as flanges 3 and 4. The outer circumferential shape of the flanges 3 and 4 is not limited to the shape of a quadrangle with rounded corners and may be circular.

A hollow core material 5 is formed by: making both ends of the core material 5, which is constituted by an engineering plastic externally coated with a laminate film, overlap outer circumferences of the projections of the terminals 1 and 2 that face each other with the space therebetween; and fixing both these ends onto the outer circumferences. A cell basic member 6 is wound around an outer circumference of the core material 5. A diameter of an outer circumference of the cell basic member 6 and diameters of the outer circumferences of the flanges 3 and 4 are almost identical.

The core material 5 is constituted by the engineering plastic that has strength and the laminate film. The laminate film does not allow electrolytes to pass through. The laminate film is constituted by a first layer formed from high-strength material such as PET or nylon, a second layer formed from aluminum foil that has a thickness of several tens of μm and that inhibits entrance or exit of gas and moisture, and a third layer formed from material such as PP that can be heat sealed.

A positive electrode current collector and a negative electrode current collector of the cell basic member 6 (see FIG. 3) are extended to opposite directions so as to form electro-conductive, heat conductive members (hereinafter, "electro-thermal conductors") 7 and 8. A tip of either the electro-thermal conductor 7 or 8 is brought into contact with and fixed to the outer circumference of the projection of either the positive electrode or negative electrode terminal 1 or 2 and is connected thereto in an electrical, heat-conductive manner.

Outer circumferential edges of the two flanges 3 and 4 have fold-back edges 3a and 4a that are oriented toward the central part of the cell. Both ends of a laminate film 9 are brought into contact with and fixed to the fold-back edges 3a and 4a and are thus wound thereonto, and the cell basic member 6 is covered by the laminate film 9. This laminate film has a three-layer structure that is equivalent to the structure of the laminate film constituting the core material 5.

In this way, the cell is sealed by the laminate film 9 and the flanges 3 and 4 including the positive electrode and negative electrode terminals 1 and 2. Accordingly, the cell is provided with a function of preventing leakage of the electrolyte inside the cell to the outside, as well as efficiently transferring heat, which is generated around the electrodes inside the cell, to the positive electrode and negative electrode terminals 1 and 2 through the current collectors and the electro-thermal conductors 7 and 8, thereby enabling efficient heat dissipation.

A first fitting member 10, which typically is a male screw, is provided on an outer surface of the positive electrode terminal 1 at the central part of the flange 3 so as to protrude outwardly, and a hole-like second fitting member 11, which typically is a female screw, is provided on an outer surface of the negative electrode terminal 2 at the central part of the flange 4. Accordingly, when a plurality of battery cells A are connected to one another, the battery cells A can be connected in such a manner that the terminal 1 and flange 3 of a battery cell A overlap with the terminal 2 and flange 4 of the adjacent battery cell A by fitting together the first fitting member 10 and the second fitting member 11 of the adjacent battery cells A; thus, a battery pack, even when formed by connecting a plurality of battery cells A together, will not take up extra space.

The first and second fitting members 10 and 11 are either members that are electro-conductive and heat conductive or members that are made from the same material as the terminals 1 and 2. It is also possible to make the first fitting member 10 into a female screw and the second fitting member 11 into a male screw. Furthermore, the first and second fitting members 10 and 11 may also not be male or female screws. It suffices if these fitting members are structured so as to be fittable and connectable to each other.

Figure 2:
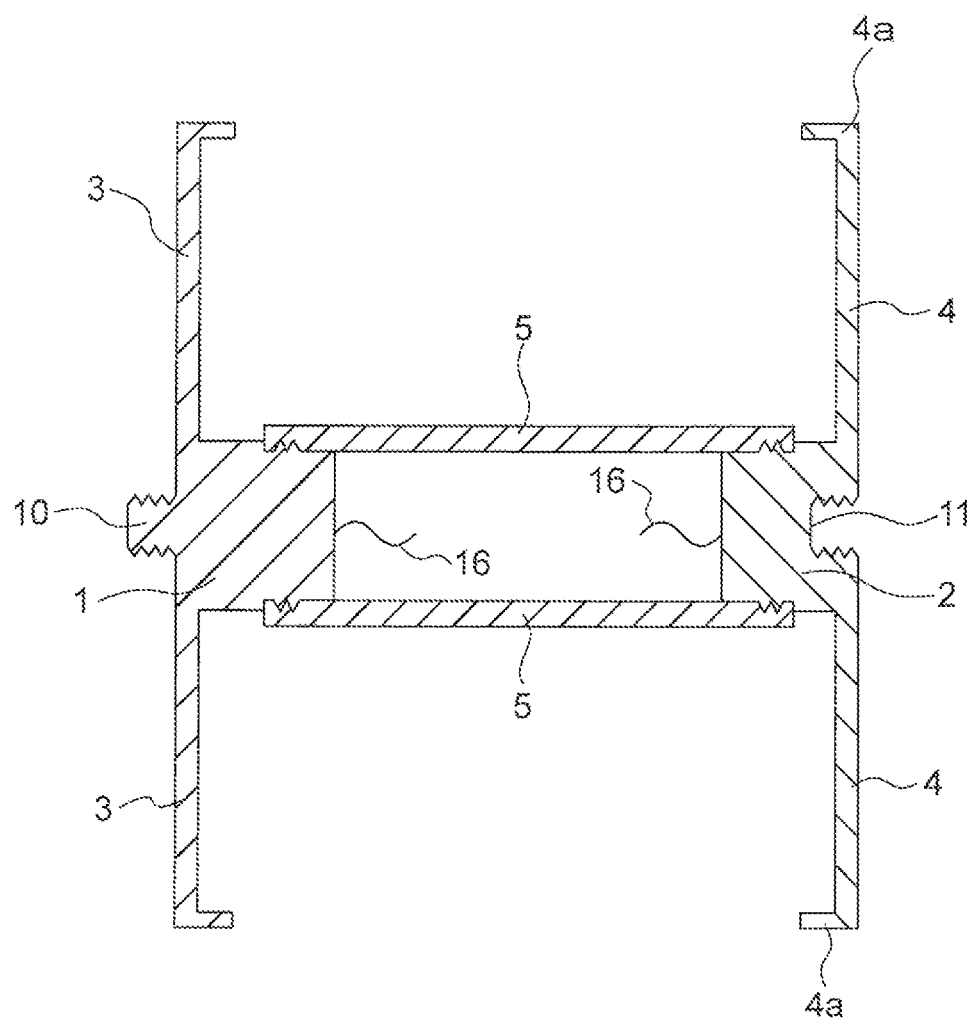
FIG. 2 is a schematic cross-sectional diagram illustrating how a core material, terminals, and flanges of the non-aqueous electrolyte secondary battery cell according to exemplary embodiment 1 of this invention are installed.

Inside the hollow part of the core material 5, there are provided a temperature sensor 12, voltage sensor 13, balancer 14, and Zener diode 15, which serve as a cell monitoring system. The temperature sensor 12, voltage sensor 13, balancer 14, and Zener diode 15 are electrically connected to the positive electrode or negative electrode terminal 1 or 2 inside the hollow part of the core material 5 via a plurality of lead wires 16 (see FIG. 2; FIG. 2 only illustrates a pair of lead wires 16 and the other pairs are not illustrated).

Figure 3:
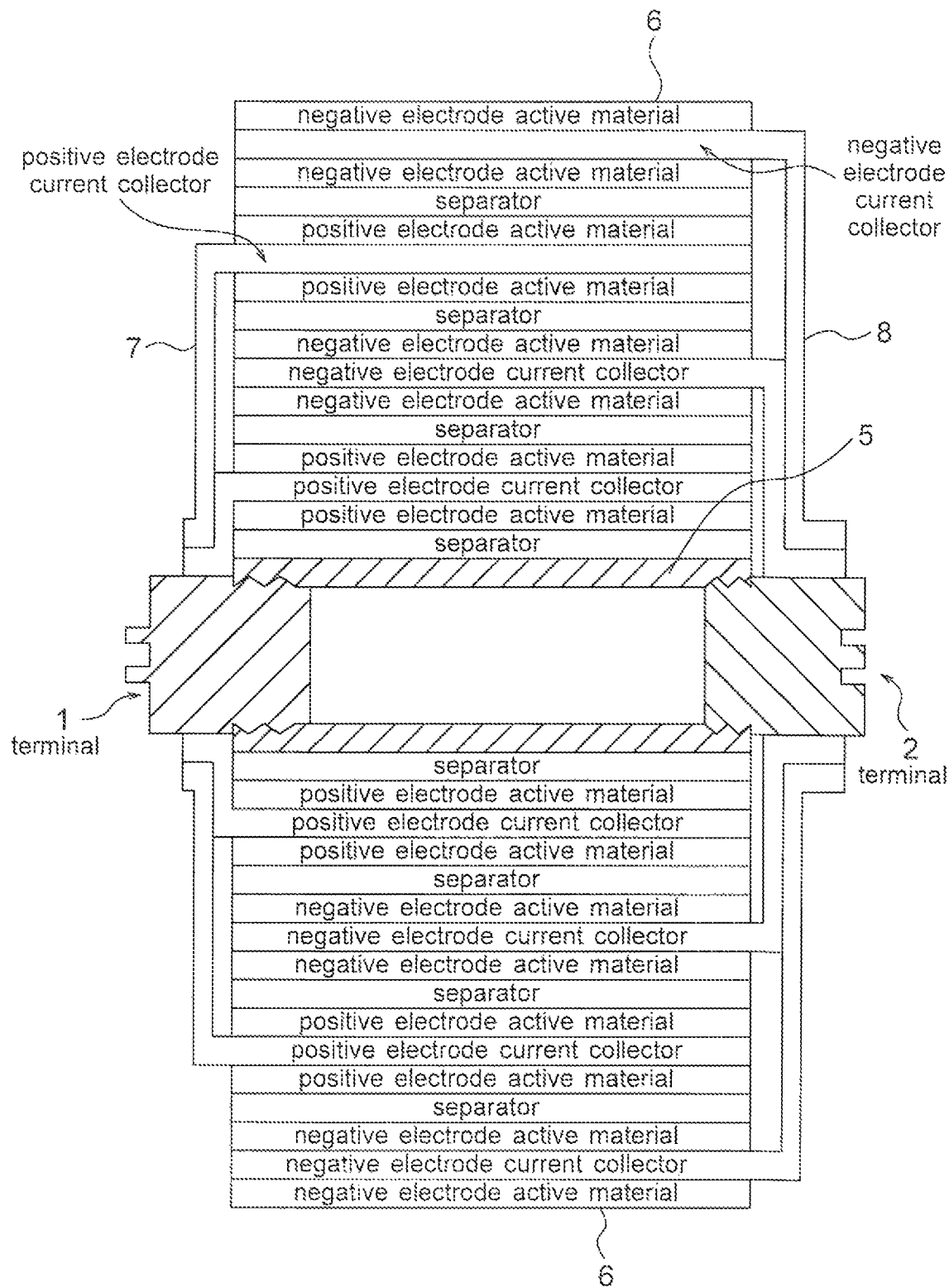
FIG. 3 is a cross-sectional diagram illustrating an outline of a case where positive electrode and negative electrode current collectors of the non-aqueous electrolyte secondary battery cell according to exemplary embodiment 1 of this invention are made into electro-thermal conductors.
Figure 4:
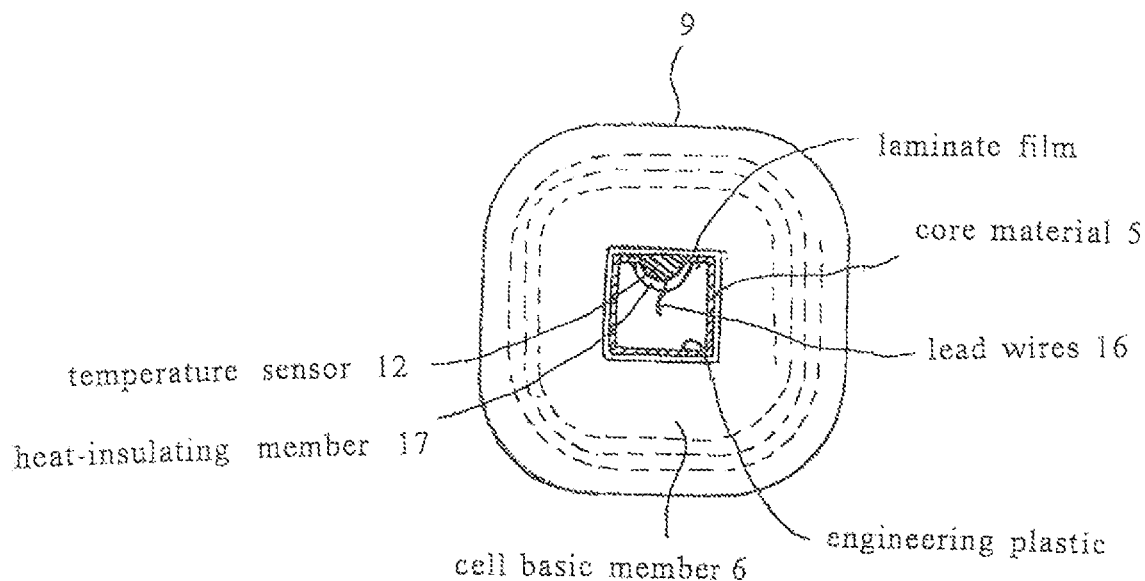
FIG. 4 is a cross-sectional diagram illustrating the core material of the non-aqueous electrolyte secondary battery cell according to exemplary embodiment 1 of this invention, a cell basic member wound around an outer circumference of the core material, and a temperature sensor.

As illustrated in FIG. 4, the temperature sensor 12 is inserted into the approximate center of the engineering plastic of the core material 5 and a surface thereof is firmly adhered onto the laminate film provided on the outer side of the core material 5. Further, an inner side of the temperature sensor 12 is covered by a heat-insulating member 17. Thus, a distance between the surface of the temperature sensor 12 and a source of heat generation, such as the cell basic member 6, is as small as a distance equivalent to a total thickness of a thickness of the laminate film of the core material 5 plus a thickness of a separator of the cell basic member 6 (see FIG. 3); this enables highly accurate measurement of a temperature of the cell.

The voltage sensor 13 has its voltmeter connected to a pair of lead wires 16 of the positive electrode and negative electrode terminals 1 and 2, in which the wires are extended from respective ends of the core material 5 (illustrated in FIG. 2).

The balancer 14 is installed for the purpose of enabling 100% efficient utilization of battery capacities and prolongation of battery life by virtue of the balancer 14 keeping voltages among the plurality of battery cells A constant. The balancer 14 is of a passive type such that: among the battery cells A in the battery pack, battery cells A with higher voltages are detected; electric power of these battery cells A is converted into heat by means of a resistor, whereby the voltages of these battery cells A are aligned with voltages of battery cells A with lower voltages; and thereafter, the entirety of the plurality of battery cells A are charged.

As a result of discharging electric power by means of a resistor as described above, a temperature inside the core material 5 is increased, but the resultant heat is dissipated to outside the battery cell A through the positive electrode and negative electrode terminals 1 and 2, flanges 3 and 4, and the entirety of the circumferential laminate film 9 via the cell basic member 6, lead wires 16, and so on.

For the Zener diode 15, one with a large capacity is used to prevent overcurrent. Accordingly, when the battery cell A is overcharged above a stipulated voltage, energy that is equivalent to the surplus voltage is converted into heat with the Zener diode 15 and, in a manner similar to the heat dissipation with the resistor of the balancer 14, heat is dissipated to outside the battery cell.

Figure 8:
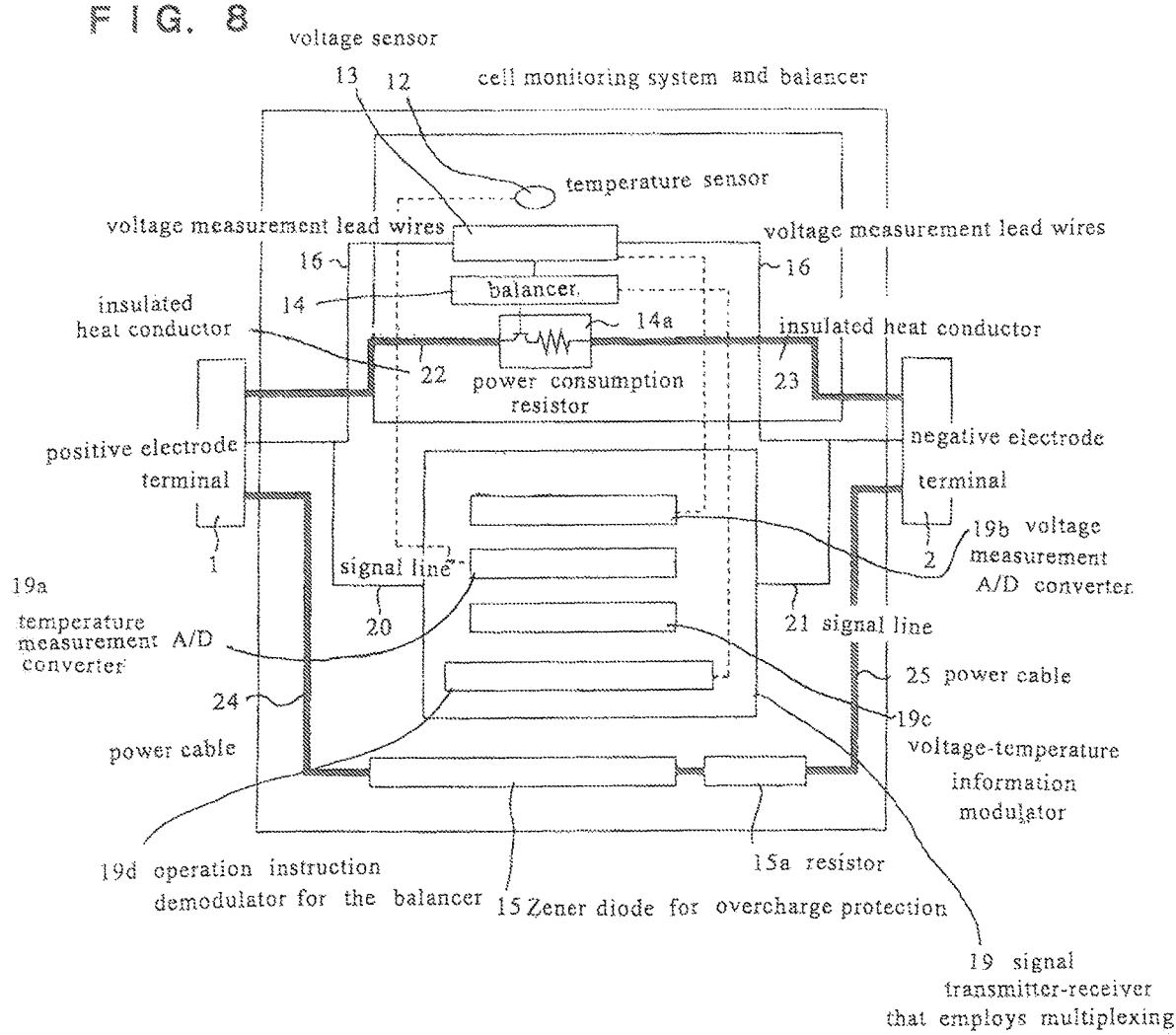
FIG. 8 is a schematic diagram illustrating a circuit configuration of a cell monitoring system of the non-aqueous electrolyte secondary battery cell according to exemplary embodiment 1 of this invention.

The inside of the hollow core material 5 is also provided with a signal transmitter-receiver 19 that employs multiplexing. As illustrated in FIG. 8, the signal transmitter-receiver 19 is provided with: a temperature measurement A/D converter 19a that is electrically connected with the temperature sensor 12; a voltage measurement A/D converter 19*b* that is electrically connected with the voltage sensor 13; a voltage-temperature information modulator 19*c* that modulates information pertaining to, for example, measured temperature values and measured voltage values measured by the temperature measurement A/D converter 19*a* and voltage measurement A/D converter 19*b* and transmits the result to the positive electrode or negative electrode terminal 1 or 2; and an operation instruction demodulator 19*d* for the balancer 14. The signal transmitter-receiver 19 is electrically connected to the positive electrode or negative electrode terminal 1 or 2 through a signal line 20 or 21.

Apart from the signal transmitter-receiver 19, there is provided a power consumption resistor 14*a* that is constituted by a transistor and a resistor and converts an output received from the balancer 14 into heat. Insulated heat conductors 22 and 23, which transmit heat generated at the power consumption resistor 14*a* to the positive electrode or negative electrode terminal 1 or 2, are connected to the power consumption resistor 14*a*. Further, the Zener diode 15 for overcharge protection is provided with a resistor 15*a* that, when the battery cell A is overcharged above a stipulated voltage, is used to convert the energy equivalent to the surplus voltage into heat, and the Zener diode 15 is connected with power cables 24 and 25 that transmit the heat to the positive electrode or negative electrode terminal 1 or 2. The voltage sensor 13 is electrically connected to the positive electrode or negative electrode terminal 1 or 2 via the pair of lead wires 16 (illustrated in FIG. 8 as "voltage measurement lead wires 16").

Measurement values of the temperature sensor 12 and voltage sensor 13 are transmitted to a battery management system (BMS), which is a device that monitors the battery pack overall, via the positive electrode or negative electrode terminal 1 or 2, and are used as command signals for control of an electric current that flows from the battery cell A or for the operation of the balancer 14. As a communication means therefor, this invention employs either wired communication via the terminal 1 or 2 or wireless radio-wave communication based on space propagation.

This wired communication is a method in which values from the sensors are converted into digital and further into voltage pulse numbers according to the values, so as to be transmitted to the terminals 1 and 2. As a consequence, in the voltage that is obtained from the terminal 1 or 2, the voltage pulse is superimposed on the direct current of the battery cell A. When the portion corresponding to the direct current is subtracted from a waveform that is formed in this way, it is possible to extract a pulse waveform alone. Thus, it is possible to obtain an accurate signal used in operating the temperature sensor 12, voltage sensor 13, and balancer 14 in each battery cell A.

A specific configuration of a unit for transmitting measurement information signals of the temperature sensor 12 and voltage sensor 13 from the cell monitoring system to outside the battery cell A, or for transmitting signals from outside the battery cell A to the cell monitoring system, is not illustrated in the figures. This unit, however, is provided with a signal transmitting-receiving function that uses a spread-spectrum technique in the following manner. A thin hole is perforated at the center of the positive electrode or negative electrode terminal 1 or 2 coaxially with the terminal 1 or 2; a non-metallic material that transmits radio waves well is inserted into the hole; then, via this material, measurement information signals of the temperature sensor 12 and voltage sensor 13 from the cell monitoring system are transmitted to outside the battery cell A or signals from outside the battery cell A are transmitted to the cell monitoring system.

Further, there is also provided a signal receiving function that uses either wired or wireless communication and that employs time division multiplexing or multiplexing based on a spread-spectrum technique, etc. for communication signals from one or more non-aqueous electrolyte secondary battery cells A, so as to multiplex signals from a plurality of cells while avoiding interference therebetween and also to improve noise immunity.

Next, the cell basic member 6 will be explained. As illustrated in FIG. 3, for a positive electrode member as a typical example, both sides of the positive electrode current collector formed from aluminum with a thickness of 20 µm are coated with a positive electrode active material with a thickness of 100 µm. This positive electrode active material employs a ternary system, into which a binder made up of polyvinylidene fluoride (6.5%) and an electrical conductor made up of carbon black (4%) have been mixed in. Further, onto a single side of the coating surface, coated is a gel-like mixture that is obtained by mixing polyvinylidene fluoride into an electrolyte that is obtained by mixing lithium hexafluorophosphate ($LiPF_6$) as a solute into a solvent that is a mixture of ethylene carbonate (EC) and propylene carbonate (PC). The amounts of EC, PC, and $LiPF_6$ in the electrolyte are mutually equivalent.

For a negative electrode member as a typical example, both sides of the negative electrode current collector formed from copper with a thickness of 10 µm are coated with a negative electrode active material with a thickness of 56 µm. This negative electrode active material is obtained by mixing into hard carbon a binder made up of polyvinylidene fluoride (4%), similarly to the positive electrode. This thickness corresponds to an amount of hard carbon that is sufficient to receive the entirety of lithium ion stored in the positive electrode during charging. Onto one surface of this coat, a gel-like electrolytic solution is coated, similarly to the positive electrode.

As illustrated in FIG. 3, a separator is interposed between the aforementioned positive electrode member and negative electrode member. For the separator, a 9 µm-thick, biaxially stretched product made from polyethylene is typically used. The separator serves to prevent short circuiting due to adherence of the positive and negative electrodes, retain the electrolyte, and transmit lithium ions that move between the positive and negative electrodes.

This separator is adhered onto the entire surface that has been coated in the form of gel on the single side of each of the positive and negative electrodes. In this way, the cell basic member 6, which is long and band-like and has a 4-layer structure, is completed and, as illustrated in FIG. 3, wound around the outer circumference of the core material 5 having the shape of a polygonal tube.

Figure 5:
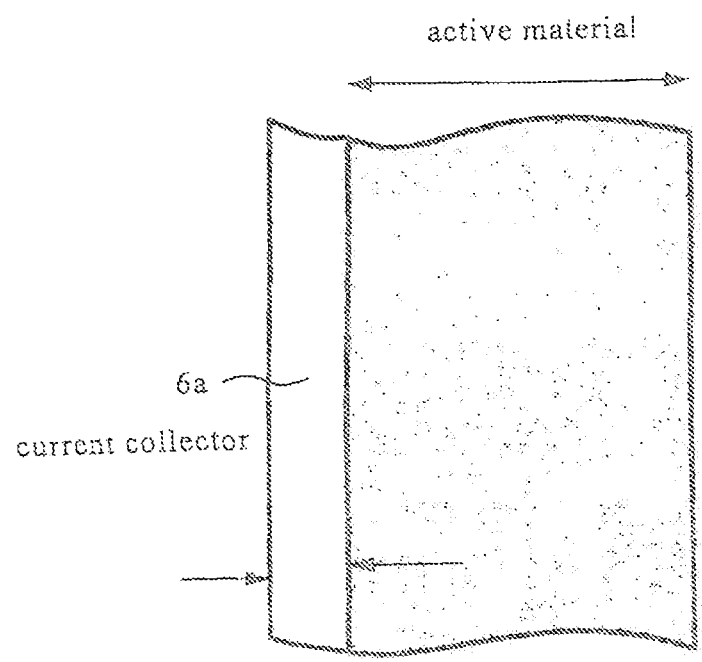
FIG. 5 is a planar diagram illustrating a polymerized state of a current collector and an active material of the non-aqueous electrolyte secondary battery cell according to exemplary embodiment 1 of this invention.

In the production of the cell basic member 6, as illustrated in FIG. 5, a band-like material that is wider than the coating surface of the battery material is used for a current collector 6*a* of each of the positive and negative electrodes, and a material for an active material is coated on a portion thereof. That is, the current collector 6*a* is coated with the active material while the end surface thereof is left uncoated. Note that although not illustrated in the figures, the respective end surfaces of the current collectors 6*a* onto which no active material is coated are provided on opposite sides for the positive and negative electrodes.

Figure 6:
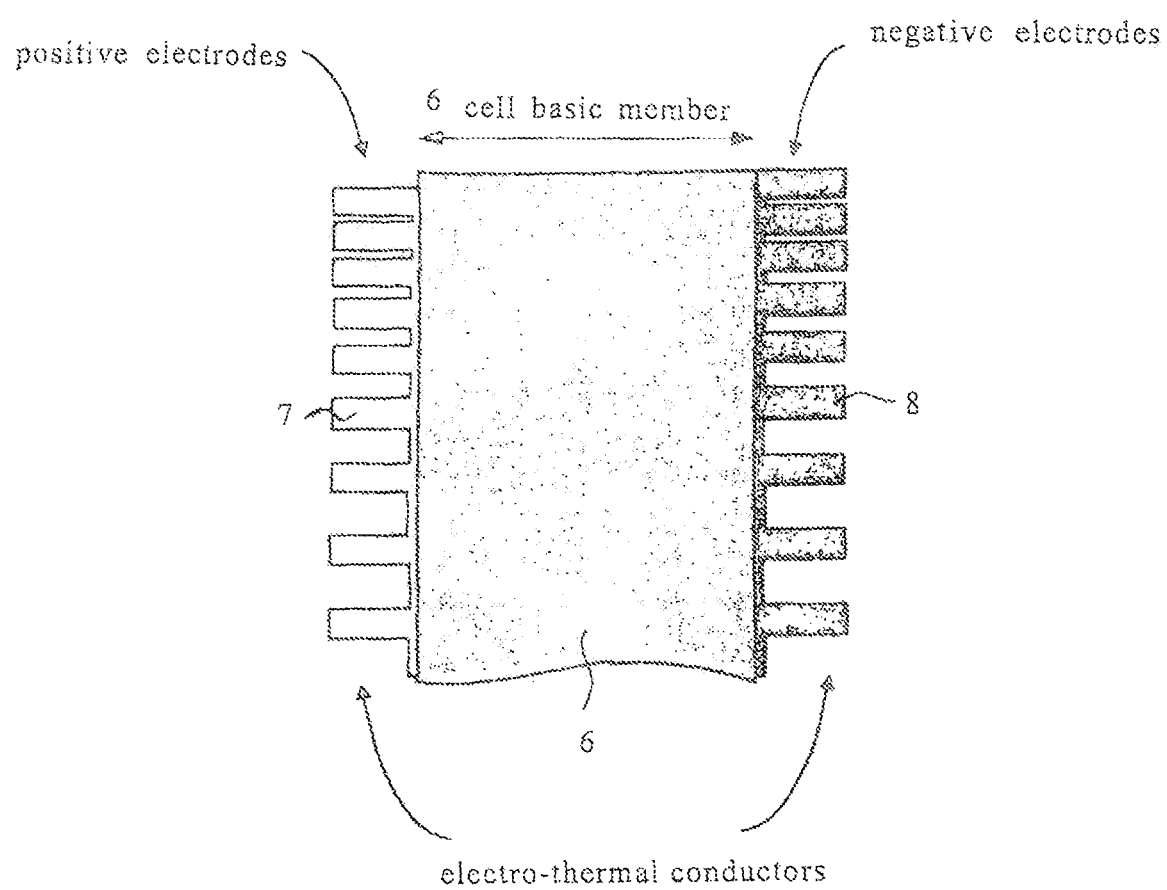
FIG. 6 is a planar diagram illustrating a polymerized state of the electro-thermal conductors, which are constituted by the positive electrode and negative electrode current collectors, and active materials of the non-aqueous electrolyte secondary battery cell according to exemplary embodiment 1 of this invention.
Figure 7:
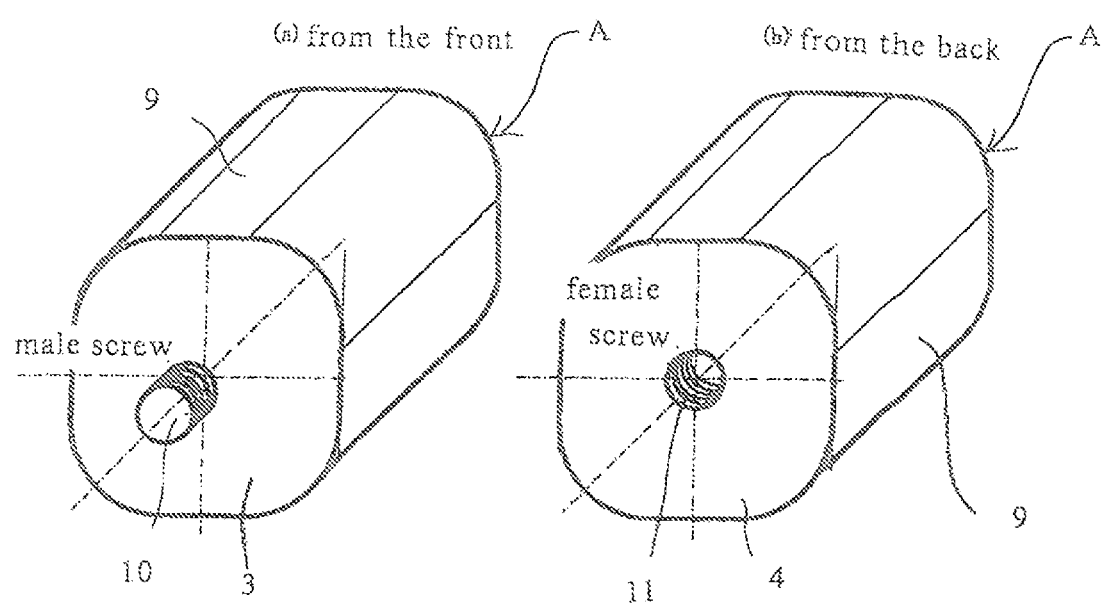
FIG. 7 is a set of perspective views, where (a) is a perspective view of the non-aqueous electrolyte secondary battery cell according to exemplary embodiment 1 of this invention as seen from the front, and (b) is a perspective view of same as seen from the back.

Then, as illustrated in FIG. 6, the portion of the current collector 6*a* of each of the positive and negative electrodes on which no active material is coated is provided with cuts along the edge and the cuts are spaced apart from one another, such that the uncut portions that remain on the current collector 6a have uniform widths while the cuts become gradually wider. This is performed on each of the current collectors 6a of the positive and negative electrodes. The portions that remain on the current collectors 6a of the positive and negative electrodes serve as the electro-thermal conductors 7 and 8.

The electro-thermal conductor 7 of the positive electrode is fixedly adhered to the outer circumference of the projection of the positive electrode terminal 1 and the electro-thermal conductor 8 of the negative electrode is fixedly adhered to the outer circumference of the projection of the negative electrode terminal 2.

Figure 9:
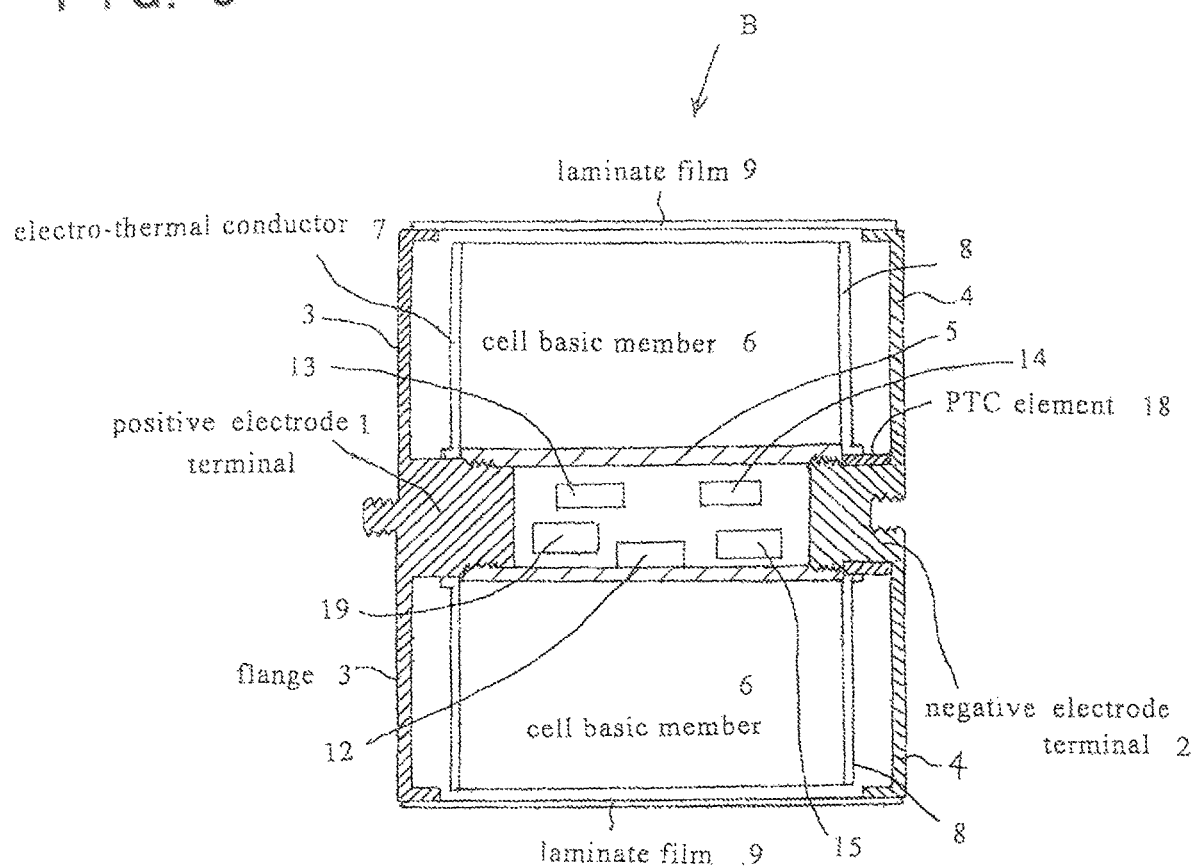
FIG. 9 is a schematic cross-sectional diagram of a non-aqueous electrolyte secondary battery cell according to exemplary embodiment 2 of this invention.

Next, exemplary embodiment 2 of this invention will be explained on the basis of FIG. 9.

In a non-aqueous electrolyte secondary battery cell B according to exemplary embodiment 2, a PTC element 18 is provided on the outer circumference of the projection of the negative electrode terminal 2. The rest of the configuration is equivalent to exemplary embodiment 1. Provision of the PTC element 18 provides the following function. That is, when there is a temperature increase, a resistance value increases so as to break a current flowing through one or more battery cells B, and when heat discharge at the Zener diode 15 exceeds the heat capacity due to overcharge or when there is external short circuiting, the battery cell(s) is (are) prevented from reaching a high temperature.

It should be noted that in addition to, or in place of, exemplary embodiment 2 above, although this is not illustrated in the figures, in the battery pack in which a plurality of the non-aqueous electrolyte secondary battery cells A are connected to one another by the first and second fitting members, it is possible to install an overcharge prevention device in which overcharge prevention switches, which automatically stop charging on the basis of a voltage value measured in the cell monitoring system, are attached to the positive and negative electrodes of the battery pack and the switches are actuated at a voltage that is 0.02±0.01 V lower than the voltage value at which the Zener diode starts discharge of the overcharge current.

Moreover, in addition to, or in place of, exemplary embodiment 2 above, although this is not illustrated in the figures, in the battery pack in which a plurality of the non-aqueous electrolyte secondary battery cells A are connected to one another by the first and second fitting members, it is possible to install an external short circuiting prevention switch in such a manner that a current measurement instrument is attached to the positive or negative electrode of the battery pack, and when an electric current that exceeds a predetermined electric current value flows, the electric current is stopped automatically.

Thus, in this invention, to cope with the overcharge described above, the Zener diode 15 is inserted inside the cell monitoring system so as to convert the overcharge electric power into heat, which is dissipated to outside the battery cell. Further, to cope with leakage of an electrolyte solution, the electrolyte is made into a gel, which greatly enhances safety. Furthermore, the terminals are provided with flanges and fold-back edges and a laminate film is passed over the fold-back edges by surface contact so as to cover the battery cell; by taking such double-measure, liquid leakage is prevented.

Moreover, to cope with abnormally high temperature inside the battery cell, current collectors of the positive and negative electrodes are extended to form electro-thermal conductors that are directly and electrically connected to the positive electrode and negative electrode terminals, and the temperature sensor, voltage sensor, balancer, and Zener diode of the cell monitoring system in the core material onto which the cell basic member is wound are connected to the positive electrode and/or negative electrode terminal(s) via a plurality of lead wires, hence internally generated heat is transmitted to the positive electrode or negative electrode terminal 1 or 2 is dissipated not only through the flanges 3 and 4 that are integral with the terminals 1 and 2 but also the entire surface of the battery cell A that is constituted by the laminate film 9, and therefore, the temperature increase can be suppressed.

Regarding cell external short circuiting, when a battery pack is constructed, resistance is sharply increased at a certain high-temperature threshold by virtue of the PTC element provided on the batter cell, thereby breaking an electric current that flows through the battery pack.

By ensuring the above-mentioned safety in this way, it is possible to obtain a battery with high energy density.

It should be noted that while in the exemplary embodiments above, portions obtained by extending the positive electrode and negative electrode current collectors of the cell basic member are made into electro-thermal conductors 7 and 8 and are used as electro-thermal conductors 7 and 8 to express the functions thereof, the current collectors may also remain as current collectors.

DESCRIPTION OF REFERENCE SYMBOLS

A: non-aqueous electrolyte secondary battery cell
B: non-aqueous electrolyte secondary battery cell
1: terminal
2: terminal
3: flange
4: flange
5: core material
6: cell basic member
6a: current collector
7: electro-thermal conductor
8: electro-thermal conductor
9: laminate film
10: first fitting member
11: second fitting member
12: temperature sensor
13: voltage sensor
14: balancer
14a: power consumption resistor
15: Zener diode
15a: resistor
16: lead wire
17: heat-insulating member
18: PTC element
19: signal transmitter-receiver
20: signal line
21: signal line
22: insulated heat conductor
23: insulated heat conductor
24: power cable
25: power cable

What is claimed is:

1. A non-aqueous electrolyte secondary battery cell, in which the cell itself has a shape of a cylinder or a polygonal tube with rounded corners, the cell comprising;
    a core material provided at a center of the cell, the core material being an insulating body having a circular or quadrangular cross-section and having a shape of a hollow tube, the core material preventing permeation of an electrolyte;

a cell monitoring system provided inside a hollow part of the core material, the cell monitoring system comprising a voltage sensor, temperature sensor, and balancer for the cell, the voltage sensor, the temperature sensor, and the balancer being attached to the cell monitoring system;

a cell basic member constituted by a positive electrode member, separator, and negative electrode member for the non-aqueous electrolyte secondary battery is wound or laminated on the core material serving as a shaft;

an electro-conductive terminal electrically connected to a current collector of the positive electrode member and an electro-conductive terminal electrically connected to a current collector of the negative electrode member are provided on the cell, the terminals being exposed to outer sides of the cell; and wherein the temperature sensor of the cell monitoring system is attached to a central part of the hollow part of the core material by being firmly adhered to the core material, and wherein the non-aqueous electrolyte secondary battery cell is connected with a wire used to dissipate heat generated at the balancer via the terminal of the positive electrode or the terminal of the negative electrode.

2. The non-aqueous electrolyte secondary battery cell set forth in claim 1, in which a Zener diode consuming surplus electric power at the time of overcharge is provided inside the cell monitoring system, and the non-aqueous electrolyte secondary battery cell is connected with a wire used to dissipate heat generated at the Zener diode via the terminal of the positive electrode or the terminal of the negative electrode.

3. The non-aqueous electrolyte secondary battery cell set forth in claim 1, in which the terminals are provided on both sides of the core material concentrically with the core material, the terminals being used for the positive electrode and the negative electrode, respectively; and the current collectors of the positive electrode member and the negative electrode member are extended toward the terminals on mutually opposite sides, the current collectors being connected to the terminals of the positive electrode and the negative electrode, respectively, in a direct, electrical, and heat-conductive manner.

4. The non-aqueous electrolyte secondary battery cell set forth in claim 3, in which a flange is provided integrally with each of the terminals of the positive electrode and the negative electrode, the flanges being centered on the corresponding terminals, the flanges and the terminals being made of the same material, the flanges respectively covering both ends of the wound or laminated cell basic member constituted by the positive electrode member, the separator, and the negative electrode member;

a fold-back edge is provided on an outer circumferential edge of each of the flanges, the fold-back edges being oriented toward the center of the cell; and the non-aqueous electrolyte secondary battery cell comprises a laminate film installed on the non-aqueous electrolyte secondary battery cell, both ends of the laminate film being bonded to the fold-back edges of the flanges on both sides, respectively, the laminate film covering the cell, the laminate film preventing leakage of an electrolyte inside the cell to outside the cell.

5. The non-aqueous electrolyte secondary battery cell set forth in claim 1, in which an electro-conductive first fitting member is provided on an outer tip part of the terminal of the positive electrode, the first fitting member being integral with the terminal of the positive electrode; an electro-conductive second fitting member is provided on an outer tip part of the terminal for the negative electrode, the first fitting member being configured to be fitted into the second fitting member.

6. The invention as set forth in claim 5, and is the non-aqueous electrolyte secondary battery cell in which fitting portions of the first fitting member and the second fitting member are plated with plate preventing electrolytic corrosion.

7. The non-aqueous electrolyte secondary battery cell set forth in claim 1, wherein an element is installed between the terminal and the current collector of the positive electrode or between the terminal and the current collector of the negative electrode, the element being a PTC element, a resistance value of the element sharply increasing due to heat; and the element provides the non-aqueous electrolyte secondary battery cell with a function of, at the time of a temperature increase inside the battery cell, breaking an electric current flowing through the battery cell and another battery cell.

8. The non-aqueous electrolyte secondary battery cell as set forth in claim 7, wherein contact portions of the terminal, the element with the sharply increasing resistance value, and the current collector are plated with plate preventing electrolytic corrosion, the terminal, the element, and the current collector contacting one another at the contact portions.

9. The non-aqueous electrolyte secondary battery cell set forth in claim 1, wherein an electrolyte of the cell basic member is gel, and the gel electrolyte is coated onto respective outer circumferential surfaces of a positive electrode active material and a negative electrode active material of the cell basic member.

10. The non-aqueous electrolyte secondary battery cell set forth in claim 1, wherein a unit configured to transmit measurement information signals of the temperature sensor and the voltage sensor from the cell monitoring system to outside the battery cell, or to transmit signals from outside the cell to the cell monitoring system, employs either wired communication via the terminal of the positive electrode or the negative electrode or wireless communication using radio waves.

11. The non-aqueous electrolyte secondary battery cell set forth in claim 10, in which the unit configured to transmit measurement information signals of the temperature sensor and voltage sensor from the cell monitoring system to outside the battery cell, or to transmit signals from outside the battery cell to the cell monitoring system, is provided with a signal transmitting-receiving function using a spread-spectrum technique, the signal transmitting-receiving function being attained by perforating a thin hole at a center of the terminal of the positive electrode or the negative electrode coaxially with this terminal, and by inserting into the hole a non-metallic material with high radio wave transmissivity; and via this material, the measurement information signals of the temperature sensor and the voltage sensor from the cell monitoring system are transmitted to outside the battery or the signals from outside the battery are transmitted to the cell monitoring system.

12. The non-aqueous electrolyte secondary battery cell set forth in claim 10, provided with a signal transmitting-receiving function using either wired or wireless communication and employing time division multiplexing or multiplexing based on a spread-spectrum technique for communication signals from one or more non-aqueous electrolyte secondary battery cells.

13. A non-aqueous electrolyte secondary batteries battery pack, the battery pack comprising the non-aqueous electrolyte secondary battery cell set forth in claim 5 in a plurality, the non-aqueous electrolyte secondary battery cells being connected to one another using the first fitting member and the second fitting member, where the battery pack comprises an overcharge prevention device;

the overcharge prevention device comprises an overcharge prevention switch attached to a positive electrode of the battery pack and an overcharge prevention switch attached to a negative electrode of the battery pack;

the overcharge prevention switches are configured to automatically stop charging on the basis of a voltage value measured in the cell monitoring system; and the switches are actuated at a voltage that is 0.02±0.01 V lower than a voltage value at which the Zener diode starts discharge of an overcharge current.

14. A non-aqueous electrolyte secondary batteries battery pack, the battery pack comprising the non-aqueous electrolyte secondary battery cell set forth in claim 5 in a plurality, the non-aqueous electrolyte secondary battery cells being connected to one another using the first fitting member and the second fitting member, where the battery pack comprises an external short circuiting prevention switch comprising a current measurement instrument; the current measurement instrument is attached to either a positive electrode or a negative electrode of the battery pack; and when an electric current exceeding a predetermined electric current value flows, the external short circuiting prevention switch automatically stops the electric current.

15. The non-aqueous electrolyte secondary battery cell set forth in claim 2, in which the terminals are provided on both sides of the core material concentrically with the core material, the terminals being used for the positive electrode and the negative electrode, respectively; and the current collectors of the positive electrode member and the negative electrode member are extended toward the terminals on mutually opposite sides, the current collectors being connected to the terminals of the positive electrode and the negative electrode, respectively, in a direct, electrical, and heat-conductive manner.

16. The non-aqueous electrolyte secondary battery cell set forth in claim 2, in which an electro-conductive first fitting member is provided on an outer tip part of the terminal of the positive electrode, the first fitting member being integral with the terminal of the positive electrode; an electro-conductive second fitting member is provided on an outer tip part of the terminal for the negative electrode, the first fitting member being configured to be fitted into the second fitting member.

17. The non-aqueous electrolyte secondary battery cell set forth in claim 2, in which an element is installed between the terminal and the current collector of the positive electrode or between the terminal and the current collector of the negative electrode, the element being a PTC element, a resistance value of the element sharply increasing due to heat; and the element provides the non-aqueous electrolyte secondary battery cell with a function of, at the time of a temperature increase inside the battery cell, breaking an electric current flowing through the battery cell and another battery cell.

18. The non-aqueous electrolyte secondary battery cell set forth in claim 11, provided with a signal transmitting-receiving function using either wired or wireless communication and employing time division multiplexing or multiplexing based on a spread- spectrum technique for communication signals from one or more non-aqueous electrolyte secondary battery cells.

* * * * *